US006894440B2

(12) United States Patent
Cristoni et al.

(10) Patent No.: US 6,894,440 B2
(45) Date of Patent: May 17, 2005

(54) METHOD AND DEVICE FOR LIGHTING AN ELECTRONIC OR ELECTROMECHANICAL APPARATUS

(75) Inventors: Romano Cristoni, Sonceboz (CH); Gian-Carlo Poli, Les Geneveys-sur-Coffrane (CH); Joachim Grupp, Enges (CH)

(73) Assignee: Asulab S.A., Marin (CH)

( * ) Notice: Subject to any disclaimer, the term of this patent is extended or adjusted under 35 U.S.C. 154(b) by 0 days.

(21) Appl. No.: 10/378,903

(22) Filed: Mar. 5, 2003

(65) Prior Publication Data

US 2003/0168998 A1 Sep. 11, 2003

(30) Foreign Application Priority Data

Mar. 5, 2002 (CH) ............................................ 0383/02

(51) Int. Cl.$^{7}$ .......................... H05B 37/02; H01K 7/10; H04B 19/30

(52) U.S. Cl. ..................... 315/291; 315/76; 315/209 R; 315/245; 368/68; 368/241

(58) Field of Search ................................ 315/291, 294, 315/300, 307, 76, 209 R, 245, 247; 368/11, 34, 46, 68, 62, 239, 241, 80, 83; H05B 37/02; H01K 7/00; H04B 19/30, 47/06

(56) References Cited

U.S. PATENT DOCUMENTS

| | | | | | |
|---|---|---|---|---|---|
| 3,757,511 | A | * | 9/1973 | Burgess et al. | 368/83 |
| 4,006,583 | A | * | 2/1977 | Vuilleumier | 368/64 |
| 4,423,963 | A | * | 1/1984 | Suzuki | 368/68 |
| 4,995,016 | A | * | 2/1991 | Watanabe | 368/67 |
| 4,995,022 | A | | 2/1991 | Ikeda et al. | |
| 6,095,661 | A | * | 8/2000 | Lebens et al. | 362/184 |
| 6,106,127 | A | * | 8/2000 | Fuwausa | 362/29 |
| 2001/0007470 | A1 | | 7/2001 | Haavisto | |

FOREIGN PATENT DOCUMENTS

EP 0 860 755 A1 8/1998

* cited by examiner

*Primary Examiner*—Trinh Vo Dinh
(74) *Attorney, Agent, or Firm*—Griffin & Szipl, P.C.

(57) ABSTRACT

The present invention is a lighting device for an electronic or electromechanical apparatus such as a timepiece of the wristwatch type. The invention including a device displaying time-related or other information, this lighting device including a light source for lighting the display device. The lighting device is characterized in that the light source is also able to measure the intensity of the ambient light. The invention also concerns a method for controlling the lighting of an apparatus of the aforementioned type.

15 Claims, 1 Drawing Sheet

METHOD AND DEVICE FOR LIGHTING AN ELECTRONIC OR ELECTROMECHANICAL APPARATUS

FIELD OF THE INVENTION

The present invention concerns a device for lighting a portable electronic device such as a wristwatch in order to facilitate the user's reading of the data provided by the device. The present invention also concerns a method for implementing such a device.

BACKGROUND OF THE INVENTION

Watches whose dial is lit using a light source to allow a user to read the time in the dark have been known for very many years. These watches differ from each other in the intensity of the lighting provided by the light source. For part of them, the light source brightly illuminates the watch dial. This can prove advantageous if a salesperson wishes to demonstrate the qualities of his product to a potential purchaser and show him the appearance the watch will have during nighttime use. The user will thus be able to see the watch display in its illuminated state, despite the lighting prevailing in the sales point. However, if the user of the watch wishes to check the time during the night, the great intensity of the lighting is likely to dazzle him. Moreover, this solution has the considerable inconvenience of consuming a large amount of energy, which constitutes a serious handicap in the case of portable electronic objects of small dimensions such as a watch whose energy storage capacities are necessarily limited. In order to overcome this drawback, it has been proposed to illuminate the watches less brightly but still sufficiently, of course, for the user of such a watch to be able to read the time-related or other information in the dark. This second solution has the main merit of being economical from the point of view of electric power consumption. However, it is practically impossible, unless one withdraws to a poorly lit place, to demonstrate the illuminating qualities of the watch at the sales point, since the illumination is too slight to be able to be seen in the light of day.

A new step was made in the state of the art by proposing, as is done, for example in U.S. Pat. No. 4,995,016 in the name of the Seikosha company, to provide the watch with a light sensor capable of detecting the various levels of intensity of the ambient lighting and adapting the illumination of the display device with which the watch is provided, as a function of the detected level of light.

A device of this type means that one no longer has to choose, during construction of the watch, between intense or low lighting, for example of the display device for the data provided by said watch. Thus, when the ambient lighting is weak (in the dark or semi-dark), lighting of the display device itself is weak, which, from the point of view of electric power consumption, is very favourable and enables the user of the watch, nonetheless to consult it at any time, particularly in the middle of the night. However, when the ambient lighting is intense, the light sensor deactivates the watch lighting means. However, when the ambient lighting is strong, the light sensor deactivates the watch lighting means. However, the watch is provided with a switch which, when it is activated, allows the watch to be brightly illuminated even in full daylight, for example in a watch boutique, in order to allow the salesperson to demonstrate the qualities of the product to a potential purchaser and show him the appearance the watch will have during night time use. The addition of an extra component in the form of a light sensor is not however without certain problems. This represents an extra cost both from the point of view of the number of components to be used and from the point of view of the assembly and manufacturing time, and introduces a new source of possible failure, which may, at more or less long term, be detrimental to the reliability of the electronic watch thereby equipped. Further, this system of detection is directive and its efficiency is a function of the location of the sensor. A shadow produced, for example, by a shirtsleeve, falsifies measurement of the degree of ambient lighting. In order to overcome these problems, those skilled in the art have no other choice than to increase the detection surface. However, this measure considerably harms the aesthetic appearance of the watch and increases its size.

It is an object of the present invention to overcome the drawbacks of the prior art in addition to others by providing a lighting device for a portable electronic object, which allows the illumination of data displayed by the electronic apparatus to be controlled reliably and inexpensively as a function of the intensity of the ambient lighting.

SUMMARY OF THE INVENTION

The present invention thus concerns a lighting device for a portable electronic or electromechanical apparatus such as a timepiece of the wristwatch type including a display device for time-related or other data, this lighting device including a light source for lighting the display device, said device being characterized in that the light source is also able to measure the intensity of the ambient lighting.

Owing to these features, the present invention provides a lighting device whose light source is capable both of illuminating the data display device of the apparatus to which it is fitted, and of detecting the degree of intensity of the ambient lighting. The present invention thus enables one to avoid using an independent light intensity sensor, which, as will easily be understood, is very advantageous insofar as it is thus possible to limit the number of components used, to simplify construction and thus limit costs. Further, the reliability of a lighting device according to the invention is improved with respect to those of similar known prior art devices.

The lighting device according to the invention can advantageously be used in combination with the optical elements used to illuminate the display device like those disclosed in European Patent Application No. EP-A-0 860 755. Indeed, the optical elements which are used to distribute the light produced by the light source over the surface, for example of a watch dial, can be used reversibly to collect the ambient light owing to the principle in accordance with which the optical paths travelled by the light are reversible. The use, in combination, of the lighting source and the elements originally used to diffuse the light produced by said lighting source to collect the ambient light provides the sensor with more reliable information as regards the degree of intensity of the ambient light than if the sensor alone was used. Indeed, this sensor includes a limited active surface and the detection signal that it provides can easily be disturbed by a passing shadow.

According to another feature of the invention, the light intensity provided by the light source is adapted to the measured ambient light intensity. Thus, if the lighting device is activated while the apparatus to which it is fitted, particularly a timepiece of the wristwatch type, is in full light, said lighting device will provide strong illumination. Consequently, a jewellery salesperson will be able to demonstrate the features of the watch to his client and show him the appearance the watch will have when the client uses his watch, for example at night. Conversely, if the lighting device is activated in a dark place, it will provide less strong illumination than in full daylight. The user will thus not be dazzled if he consults his watch during the night, and the electric power consumption will be limited, which increases the life time of the batteries powering the watch.

According to yet another feature of the invention, account is taken of the time necessary for the human eye to become accustomed to the dark. Thus, if a user passes quickly from an illuminated place to a dark place and he wishes to consult his watch immediately afterwards, the lighting device will consider that the user's vision has not yet adjusted to the new lighting conditions and will illuminate the watch display device brightly. However, if the user wishes to consult his watch after a longer period of time, when it will be deemed that said user's vision has adjusted to the night vision conditions, the lighting device will shine weakly.

The present invention also concerns a method for lighting a display device for time-related or other information for an electronic or electromechanical apparatus such as a timepiece of the wristwatch type, including a light source for lighting the display device, characterized in that the light source is also used to measure the intensity of the ambient light.

BRIEF DESCRIPTION OF THE DRAWINGS

Other features and advantages of the present invention will appear more clearly from the following detailed description of an embodiment example of the lighting device according to the invention, this example being given purely by way of non-limiting illustration, in conjunction with the annexed drawings, in which.

DETAILED DESCRIPTION OF THE INVENTION

The present invention proceeds from the general inventive idea that consists in using the same lighting source, not only for lighting the display device of an electronic or electromechanical apparatus such as a wristwatch, but also as a detector of the ambient lighting intensity to adapt the intensity of the display device lighting to the environmental conditions. Owing to this feature, the number of components to be used is limited and the manufacture of such a display device is made simpler and thus more economical. Moreover, a display device of this type has improved reliability.

The present invention will be described with reference to an electronic apparatus of the wristwatch type. It goes without saying that the invention is not limited by the type of display device used. It may be a dial above which hands move or a liquid crystal cell. Likewise, the invention is not limited to the horological field and can be applied to any other type of portable apparatus such as a wireless or portable telephone or other.

Illumination of a wristwatch can occur using various means, amongst which the following can be cited:

electroluminescent sheets on which designs are printed or which are used in combination with a partially transparent dial;

a light guide, for example a ring-shaped light guide, as disclosed in European Patent No. EP-A-0 860 755;

a planar light guide that is either arranged on the dial (front lighting), or above it when the dial is partially transparent (back-lighting);

the hands of the watch as is disclosed, for example, in U.S. Pat. No. 4,995,022;

lighting sources as disclosed in U.S. Pat. No. 6,106,127.

The methods succinctly described above are more particularly suited for implementing the present invention. Of course, these methods remain valid if the watch dial is partially or entirely formed by a liquid crystal display cell.

Figure 1:
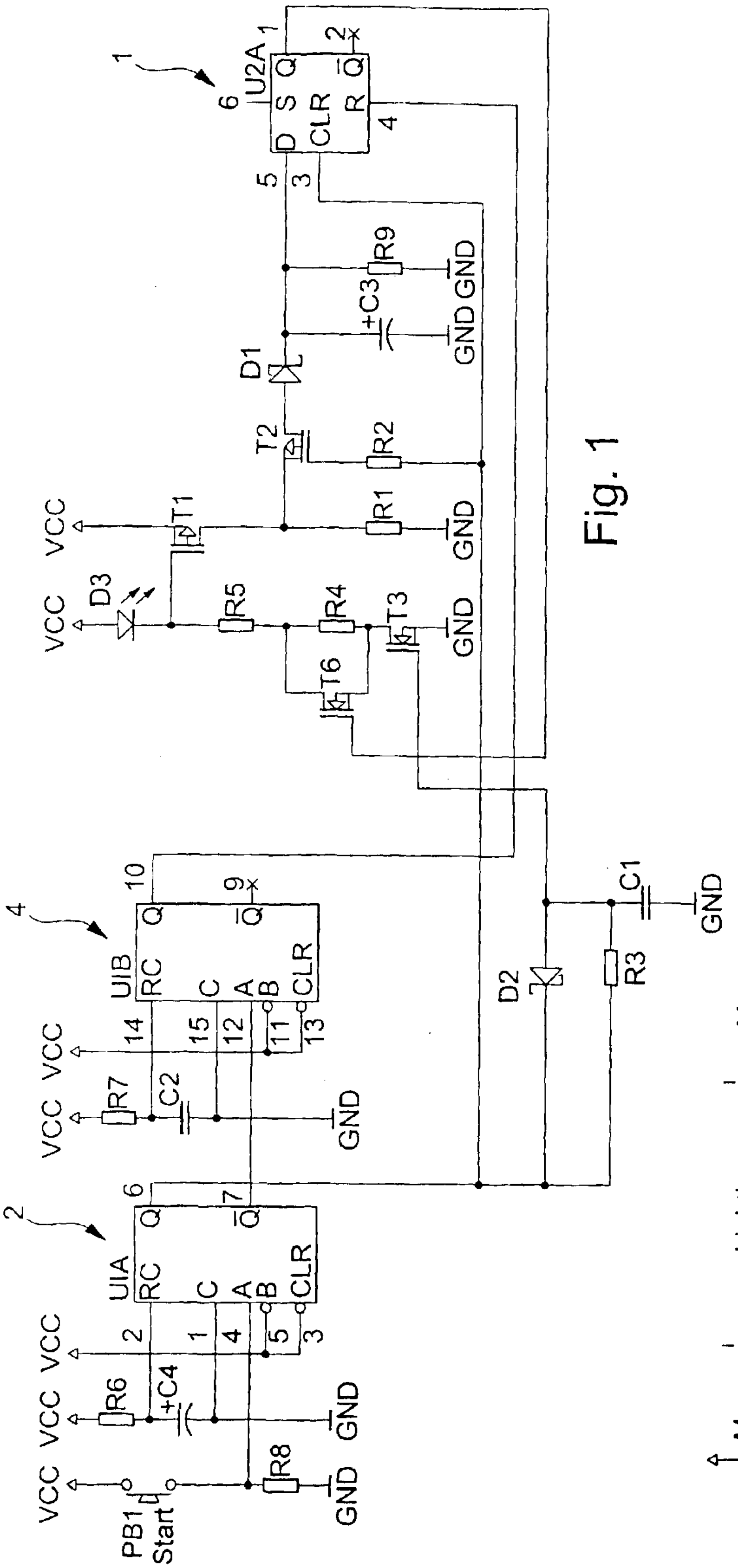
FIG. 1 is a circuit diagram of the lighting device according to the invention.

Reference will be made first of all to FIG. 1. During the standby phase, light emitting diode D3, does not play the role of lighting means, but, conversely, operates in a mode in which it detects the degree of ambient luminosity. Within the scope of the present invention, one could use, for example, the diodes marketed by the Agilent company under the references HSMB-190C and HSMC-S690 or the diode marketed by Stanley under the reference FR1111C. Diode D3, connected to the gate of a transistor T1, thus forms therewith a measuring stage that works like a current generator whose intensity will depend on the degree of ambient luminosity. One thus has a current source controlled by LED D3. The current produced by this current source passes through a resistor R1 which is connected to the drain of transistor T1 and which creates a voltage drop proportional to the current produced by said current generator. One thus has a voltage which is a function, on the one hand of the current produced by the current source controlled by diode D3, and on the other hand of the actual value of resistor R1. As will be better understood in the following part of the description, the choice of the value of resistor R1 will allow a voltage threshold to be fixed below which diode D3, when energised, will produce intense lighting, and beyond which diode D3 will produce limited lighting.

As can be seen in the circuit diagram, switching means comprising a transistor T2 are connected to the common point between transistor T1 and resistor R1. During the standby phase, transistor T2 is still conductive and thus allows the voltage present across the terminals of said resistor R1 to be quickly applied to a capacitor C3. This capacitor C3 is mounted in parallel with resistor R1 via a non-return diode D1, which prevents said capacitor C3 from discharging through resistor R1. Likewise, capacitor C3 is associated with a resistor R9 with which it forms an RC circuit whose time constant determines the speed at which capacitor C3 can discharge through resistor R9. This RC circuit thus forms a memory stage, which will store a state corresponding to a weak or strong ambient luminosity level as a function of the electric signal produced by the measuring stage. It will be seen hereinafter that the value of the time constant of the circuit formed by capacitor C3 and resistor R9 is adjusted as a function of the time necessary for the human eye to adjust to modifications in the ambient lighting.

The elements described up to now thus define two time constants. The first of these constants corresponds to the very short time that is necessary to charge capacitor C3 via anti-return diode D1, the latter having a very low resistance. The second time constant defined by the elements described hereinbefore corresponds to the time necessary for capacitor C3 to be discharged into resistor R9. This time is longer than the time necessary to charge capacitor C3 and is adjusted as a function of the human vision parameters as already mentioned. Consequently, when the device according to the invention is in intense ambient lighting conditions, the current generator formed by LED D3 and transistor T1 associated therewith will very quickly charge capacitor C3. If then, the device according to the invention passes into an environment where the ambient lighting is weaker, capacitor C3 will gradually be discharged through resistor R9. It should be understood, in fact, that if the device according to the invention passes from a place that is brightly illuminated to a place that is less so, at the moment of this transition, there is a situation in which the potential drop created by resistor R1 which is, it should be recalled, proportional to the current produced by diode D3, is less than the potential of capacitor C3. Consequently, the current generator formed by said diode D3 and transistor T1 cannot recharge capacitor C3. This will only be possible again at the moment when capacitor C3 is sufficiently discharged and its potential becomes less than the potential present across the terminals resistor R1. Thus, the fluctuations in voltage present across the terminals of capacitor C3 are the faithful reflection of the variations in intensity of the ambient lighting.

As can be seen in FIG. 1 annexed to the present Patent Application, RC circuit formed by capacitor C3 and resistor R9 is connected to the logic input D of a flip-flop 1. This flip flop 1 constitutes a stage which, when a signal commanding the light source to be switched on is produced, adapts the intensity of light provided by said light source as a function of the electric state stored in the memory stage. More precisely, flip flop 1 will consider that its input D is at a high logic level "1" or low logic level "0", depending on whether the voltage applied at this input is greater than a first given value, for example 1.7 volts, or less than a second given value, for example 1.2 volts. In a conventional manner, flip flop 1 has the function of applying, without modification, the logic state in which it finds its input D to its output Q via the effect of external solicitation? In the case of the present invention, this external solicitation takes the form of an application of pressure on a push-button PB1 which, at moment t1 (see FIG. 2, "start" curve) sets output Q of a timing circuit 2 at a high level "1". As can be seen in the circuit diagram, output Q of timing circuit 2 is directly connected to clock input CLK of flip-flop 1. Thus, when push-button PB1 is pressed at moment t1, timing circuit 2 is switched on, which has the effect of transferring the logic state of input D of flip flop 1 towards output Q thereof, and holding said output Q in this state for a certain period of time after push-button PB1 has been activated. This period of time is imposed by timing circuit 2 and corresponds to the time interval t1-t3 on the "tempo" curve of FIG. 2. The state of output Q of flip-flop 1 is thus the image of the ambient lighting conditions at the moment when push-button PB1 was activated.

Output Q of timing circuit 2 is also connected to the gate of transistor T2. As was already mentioned previously, transistor T2 is conductive during the entire duration of the standby phase of the device according to the invention, and capacitor C3 is connected to the current generator formed by LED D3 and transistor T1 via anti-return diode D1 and said transistor T2. However, as soon as diode D3 is no longer being used as the ambient light intensity sensor, but as a lighting source, the memory stage (capacitor C3, resistor R9) must immediately be uncoupled from the measurement or integration stage (diode D3, transistor T1, resistor R1) to avoid falsifying the charge state of said capacitor C3. This is the role of the signal generated at the output Q of timing circuit 2 which has just made transistor T2 non-conductive.

When push-button PB1 is pressed to command LED D3 to be switched on, this has the effect of setting logic output Q of timing circuit 2 to "1". Then, the logic state of input D of flip flop 1 is transferred to its output Q and transistor T2 is made non-conductive to isolate capacitor C3 from the current generator formed by diode D3 and transistor T1 and controlled by the degree of ambient luminosity. At the same time, the high level of logic output Q of timing circuit 2 is applied to the gate of a transistor T3 to make the latter conductive and allow diode D3 to be supplied with electric energy. However, transistor T3 which controls lighting is made conductive only at moment t2 (see FIG. 2 curve "LED"), i.e. with a small time lag after moment t1 when push-button PB1 is activated. This lag is introduced by an RC circuit formed of a capacitor C1 and a resistor R3 arranged between timing circuit 2 and transistor T3. This deferred switching on of diode D3 allows one to ensure that the state of the electric charge accumulated in capacitor C3 is not modified.

Figure 2:
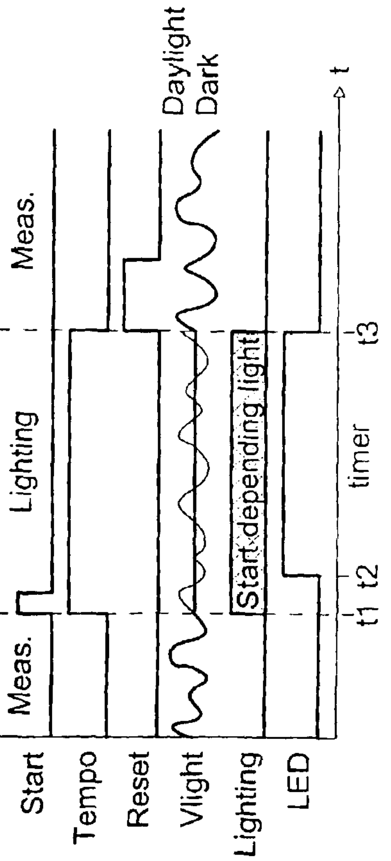
FIG. 2 is a histogram of showing the evolution of the voltage across the terminals of different elements of the lighting device according to the invention.

The high or low logic level of output Q of flip-flop 1 is shown in the "lighting" curve of FIG. 2. Two bold horizontal lines indicate the logic state "0" or "1" of output Q of flip-flop 2. The logic state of output Q is a function of the charge state of capacitor C3 at moment t1 when push-button PB1 is pressed. Indeed, as long as diode D3 operates as a sensor, the voltage across the terminals of capacitor C3 fluctuates as a function of variations in the ambient light intensity (see FIG. 2, curve "Vlight"). At instant t1 when push-button PB is pressed, the state of charge of capacitor C3 is fixed and remains substantially the same for the entire duration of the timing, although the lighting conditions may continue to fluctuate as is indicated in dotted lines on curve "Vlight" of FIG. 2. Indeed, because of its time constant, capacitor C3 is discharged slowly in comparison with the duration of the timing signal which corresponds to the period of time during which LED D3 remains switched on. At the end of the timing, capacitor C3 is again powered and quickly finds a charge level corresponding to the ambient lighting conditions.

The high or low logic level of output Q of flip flop 1 is applied to the gate of a transistor T6. Afterwards, if output Q of flip flop 1 is in the "0" logic state, transistor T6 remains open and diode D3 is powered with a minimum current through two resistors R4 and R5 series connected between said diode D3 and said transistor T6. However, if output Q of flip-flop 1 is in logic state "1", transistor T6 closes and diode D3 is then powered with a maximum current through the single resistor R5. Indeed, when transistor T6 is conductive, it practically short-circuits resistor R4 insofar as the value of its internal resistance is very low compared to that of R4.

At the end of the timing, the logic state of output Q of the timing circuit passes to "0". Immediately, transistor T3 opens, causing diode D3 to be switched off. Likewise, transistor T2 closes again, such that capacitor C3 is again connected to the current source stage formed by diode D3 and transistor T1 and its charge state gradually finds a level corresponding to the ambient light intensity. Finally, a second timer 4 resets logic output Q of flip-flop 1 to zero (see FIG. 2, "reset" curve).

An operating cycle of the device according to the invention will now be examined. It is assumed, to start, that the device is in the standby state, i.e. in a state where LED D3 is not illuminated but is only used to detect the degree of ambient light intensity. It is further assumed that at the beginning of this operating cycle, the device is in the light.

In the device's standby state, transistor T3 is non-conductive since LED D3 does not have to be electrically powered. Conversely, transistor T2 is closed and thus conductive such that the voltage present across the terminals of resistor R1 can be applied to the terminals of capacitor C3 and thus allow the latter to be charged. It will be recalled that the voltage across the terminals of resistor R1 result from the current, which passes through the latter, and which is produced by LED D3 and transistor T1 operating as an ambient luminosity controlled current generator. It will easily be understood that the charge state of capacitor C3 is a function of the potential drop at the common point between the drain of transistor T1 and resistor R1. Thus, the value of resistor R1 will determine the value of the voltage applied to logic input D of flip flop 1 and allow the latter to decide whether its logic input D is at high level "1" or low level "0". Depending upon whether logic input D of flip flop 1 is at "0" or "1" at the moment when push-button PB1 is activated, this will determine the intensity of the electric current powering diode D3 and thus the low or high intensity of the lighting produced by said diode D3.

Since the device according to the invention is in the light, let us assume that push-button PB1 is activated. The state of charge of capacitor C3 is at a high level, such that the logic state of input D of flip flop 1 is at its high level "1". Via the effect of activation of push-button PB1, output Q of timing circuit 2 passes to "1" and orders the transfer of logic state "1" of input D of flip-flop 1 to output Q of the latter. Simultaneously, timing circuit 2 makes transistor T2 to be non-conductive so that the state of charge of capacitor C3 is not falsified by LED D3 being switched on. Likewise, timing circuit 2 makes transistor T3 to be conductive so that diode D3 can be supplied with electric current. Diode D3 is however powered only a brief moment after push-button PB1 has been activated, this timing being generated by an RC circuit formed of a capacitor C1 and a resistor R3 and ensuring, here too, that the state of charge of capacitor C3 will not be modified by diode D3 being switched on. Finally, the high level "1" of output Q of flip flop 2 is applied to the gate of transistor T6 in order to make it conductive, such that the current which will power diode D3 is limited only by resistor R5. The lighting of diode D3 will therefore be maximal. This functions is especially useful when a salesperson in a jewellery shop wishes to show a client the appearance that the watch has when lit in the semi-darkness. Indeed, despite the brightness of the sales point, diode D3 will shine sufficiently brightly for the client to be able to see the lighting of said watch. After a certain operating time of diode D3, that is determined by timing circuit 2, logic output Q of said timing circuit 2 passes to zero. Immediately, transistor T3 is made non-conductive, causing diode D3 to be switched off, and transistor T2 is made conductive, such that capacitor C3 gradually returns to a state of charge corresponding to the ambient luminosity.

Let us assume now that the user passes suddenly from a light environment to a semi-dark environment and that he wishes to consult his watch. On passing from a brightly lit place to a place that is less well lit, the device according to the invention will be in a situation in which the potential drop created by resistor R1 which is a function of the degree of intensity of the ambient luminosity, will be less than the potential of capacitor C3. Consequently, the current generator formed by LED D3 and transistor T1 cannot recharge capacitor C3 and the latter will start to discharge gradually through resistor R9. The speed at which capacitor C3 is discharged is fixed by the time constant of the circuit formed by said capacitor C3 and resistor R9. This is a parameter that can be adjusted as a function of the values of C3 and R9.

According to the invention, the value of the time constant of circuit C3, R9 will be of the order of several minutes. It is in fact a period of time that corresponds to the mean time necessary for the human eye to become accustomed to the dark when the person comes from a brightly lit environment. Thus, if the user activates push-button PB1 before the state of charge of capacitor C3 has reached the potential drop value at the common point between transistor T1 and resistor R1, the state of logic input D of flip flop 1 will be high and diode D3 will shine brightly. If, conversely, the user activates push-button PB1 while capacitor C3 has been discharged through resistor R9 and the voltage across its terminals corresponds to the voltage across the terminals of resistor R1, in this case the state of logic input D of flip flop 1 will be low and LED D3 will shine weakly. This feature of the invention advantageously enables the user to read the indications provided by his watch in all circumstances. Thus, if the user passes abruptly from the light to the semi-darkness, and he activates push-button PB1 shortly afterwards, LED D3 will shine brightly to allow him to read the data displayed by his watch since his vision will not yet be fully used to the dark. Conversely, if a longer period of time elapses between the moment when the user enters the darkness and the moment when he wishes to consult his watch, the lighting intensity provided by diode D3 will be weak. Indeed, the user's eyes will have had time to become accustomed to night vision and it will thus no longer be necessary to light the watch brightly. This has a double advantage: on the one hand the user is not dazzled when he consults his watch, for example at night, and on the other hand substantial energy savings are made.

Finally the case in which one passes quickly from the semi-darkness to the light has to be examined. In this case, via transistor T2, the capacitor almost instantaneously reaches a state of charge corresponding to strong illumination, such that if the user activates push-button PB1, logic input D of flip flop 1 is at a high level "1" corresponding to the case in which LED D3 provides intense lighting.

It goes without saying that the present invention is not limited to the embodiments that have just been described, and that various simple modifications and variants can be envisaged without departing from the scope of the present invention. In particular, one could envisage that the resistor values could be programmed by the user in order to adjust the capacitor charge and discharge time and thus the lighting adjustment times to day and nighttime vision conditions. Another advantageous embodiment consists in using an electronic circuit which illuminates a liquid crystal cell in a pulsed manner in order to improve the display legibility and contrast. Indeed, if one measures the display contrast of a liquid crystal cell integrated in a watch, a beat of this contrast synchronised with the electrode addressing signal of said cell will be noted? Thus, if the pulsed illumination is synchronised with the liquid crystal cell in an optimum manner, the observer will only see the maximum display contrast.

What is claimed is:

1. A lighting device for an electronic or electromechanical apparatus, the lighting device including:

a display device for displaying time-related data or data not related to time;

a light source arranged to light the display device and to measure intensity of ambient light;

a measurement stage that provides an electric signal representative of the ambient lighting conditions;

a memory stage that stores an electric state corresponding to a low or strong luminosity level as a function of the electric signal generated by the measurement stage; and a third stage which, when a signal ordering the light source to be switched on is produced, adapts the intensity of the light provided by said light source as a function of the electric state stored in the memory stage.

2. The lighting device according to claim 1, wherein the measurement stage includes the light source associated with a transistor so as to form a current generator controlled by the ambient light intensity.

3. The lighting device according to claim 2, wherein the memory stage includes a capacitor connected in parallel to terminals of a resistor so as to form an RC circuit whose time constant value is adjusted as a function of the capacitance values of the capacitor and the resistor.

4. The lighting device according to claim 3, wherein the time constant value corresponds to the time necessary for the human eye to become accustomed to the dark.

5. The lighting device according to claim 3, wherein a circuit controlling the switching on of the light source includes a flip flop mounted following the circuit formed by the capacitor and the resistor, the high or low state of a logic input D of the flip flop being a function of the state of charge of the capacitor, this state being transferred to a logic output Q of the same flip flop upon reception of the control signal ordering the light source to be switched on, the output Q of said flip flop then controlling means capable of powering the light source with strong or weak current depending upon whether the logic state of said output Q is high or low.

6. The lighting device according to claim 5, wherein the means for controlling the intensity of the current powering the light source includes at least two series connected resistors, one of which short-circuits by a transistor arranged across the terminals of the one resistor when the transistor is made conductive.

7. The lighting device according to claim 5, wherein the control signal is generated by a timing circuit, this timing circuit ordering closure of switching means for connecting the light source to a power source and determining the time during which said light source will remain switched on.

8. The lighting device according to claim 7, wherein the switching means include a transistor.

9. The lighting device according to claim 7, wherein the light source is powered with a timing with respect to the transmission of the control signal for switching on said light source.

10. The lighting device according to claim 9, wherein the timing is generated by an RC circuit including a capacitor and a resistor.

11. The lighting device according to claim 5, wherein when the light source is switched off, a second timing circuit resets the logic output Q of the flip flop to zero.

12. The lighting device according to claim 3, Wherein the memory stage is separated from the measurement stage by an anti-return diode preventing the capacitor from discharging into said measurement stage.

13. The lighting device according to claim 3, wherein switching means are arranged between the measurement stage and the memory stage, these switching means being conductive for as long as the light source measures the ambient light intensity, and being non conductive upon reception of the signal ordering the light source to be switched on in order to avoid disturbing the state of charge of said memory stage.

14. The lighting device according to claim 13, wherein the switching means include a transistor.

15. A lighting method for a device displaying time-related data, or data not related to time, for an electronic or electromechanical apparatus, wherein the method includes the steps of:

providing an electronic or electromechanical apparatus having a display device for displaying time-related data, or data not related to time, wherein the apparatus includes a light source arranged to light the display device and to measure the intensity of ambient light and a programmable circuit connected to power the light source;

programming the programmable circuit with times for adapting the lighting of the light source to day and night vision conditions;

lighting the display device with the light source; and measuring the intensity of ambient light using the light source.

* * * * *